United States Patent [19]
Jones et al.

[11] Patent Number: 5,676,353
[45] Date of Patent: Oct. 14, 1997

[54] HYDRAULIC LEVER ACTUATOR

[75] Inventors: Owen Jones, Chattisham; Michael C. J. Trinder, East Bergholt, both of England

[73] Assignee: Noise Cancellation Technologies, Inc., Linthicum, Md.

[21] Appl. No.: 969,272

[22] PCT Filed: Jul. 19, 1991

[86] PCT No.: PCT/GB91/01210
§ 371 Date: Nov. 1, 1994
§ 102(e) Date: Nov. 1, 1994

[87] PCT Pub. No.: WO92/02107
PCT Pub. Date: Feb. 6, 1992

[30] Foreign Application Priority Data
Jul. 20, 1990 [GB] United Kingdom ............. 9015984

[51] Int. Cl.$^6$ ............. H04R 1/42; F16F 15/02; F15B 7/00
[52] U.S. Cl. ............. 267/140.14; 267/218; 248/550
[58] Field of Search ............. 267/118, 124, 267/140.11, 140.13, 140.14, 140.15, 136, 218–220; 248/562, 636, 550, 559; 180/300, 312, 902

[56] References Cited

U.S. PATENT DOCUMENTS 3,456,755 7/1969 Walker ............. 181/163
5,423,523 6/1995 Gossman et al. ............. 267/140.15

FOREIGN PATENT DOCUMENTS 2210608 9/1972 Germany.

*Primary Examiner*—Josie Ballato

[57] ABSTRACT

An actuator having a linear current force characteristic comprises a moving coil transducer and a hydraulic lever. The moving coil is capable of producing only a relatively low force but with a relatively large displacement. The coil is formed on a piston which acts as an input piston to a hydraulic level. An output piston has a much larger area than the input piston. Thus, the long throw, low force input to the hydraulic lever is converted into a short throw, high force output at the second piston.

12 Claims, 3 Drawing Sheets

યુ.એસ. 5,676,353

HYDRAULIC LEVER ACTUATOR

FIELD OF THE INVENTION

The present invention relates to an improved electromagnetic actuator for use in vibration cancellation systems.

BACKGROUND OF THE INVENTION

It has been proposed to cancel vibrations in a mechanical system by sensing the vibrations and utilising an electronic control circuit to drive a mechanical actuator in order to apply vibrations to the system which tend to cancel out the original source of vibration. For example, it has been proposed to use a mechanical actuator in association with an engine mount for an internal combustion engine to apply cancelling vibrations to the engine for producing smooth running.

Known actuators are of the moving-iron type, wherein a magnetic field is produced which interacts with a metal armature to generate a force thereon. The armature then moves under the influence of the generated force. A disadvantage of these actuators is that the force generated is non-linear with respect to armature displacement. It is, therefore, an object of the present invention to provide an actuator having more linear characteristics than moving-iron type actuators by employing either a constant or variable volume hydraulic lever.

SUMMARY OF THE INVENTION

According to a first aspect the present invention there is provided an electromagnetic actuator comprising a moving-coil electrical signal-to-displacement transducer and a hydraulic lever wherein the hydraulic lever transforms the transducer output.

According to a second aspect of the present invention there is provided an electromagnetic actuator comprising a rotary electric motor and a hydraulic lever wherein the hydraulic lever transforms the motor output. Preferably, the motor drives an Archimedean screw in order to transfer hydraulic fluid between a hydraulic fluid reservoir and a hydraulic lever working chamber. However, other forms of reversible rotary pump may usefully be employed.

Advantageously, two counter-rotating Archimedean screws may be used in order to balance out stator rotational reaction forces.

Conveniently, the actuator according to the present invention may be employed as an engine mounting as part of a vibration cancellation system.

BRIEF DESCRIPTION OF THE DRAWINGS

Embodiments of the present invention will now be described, by way of example, with reference to the accompanying drawings, in which.

Figure 1:
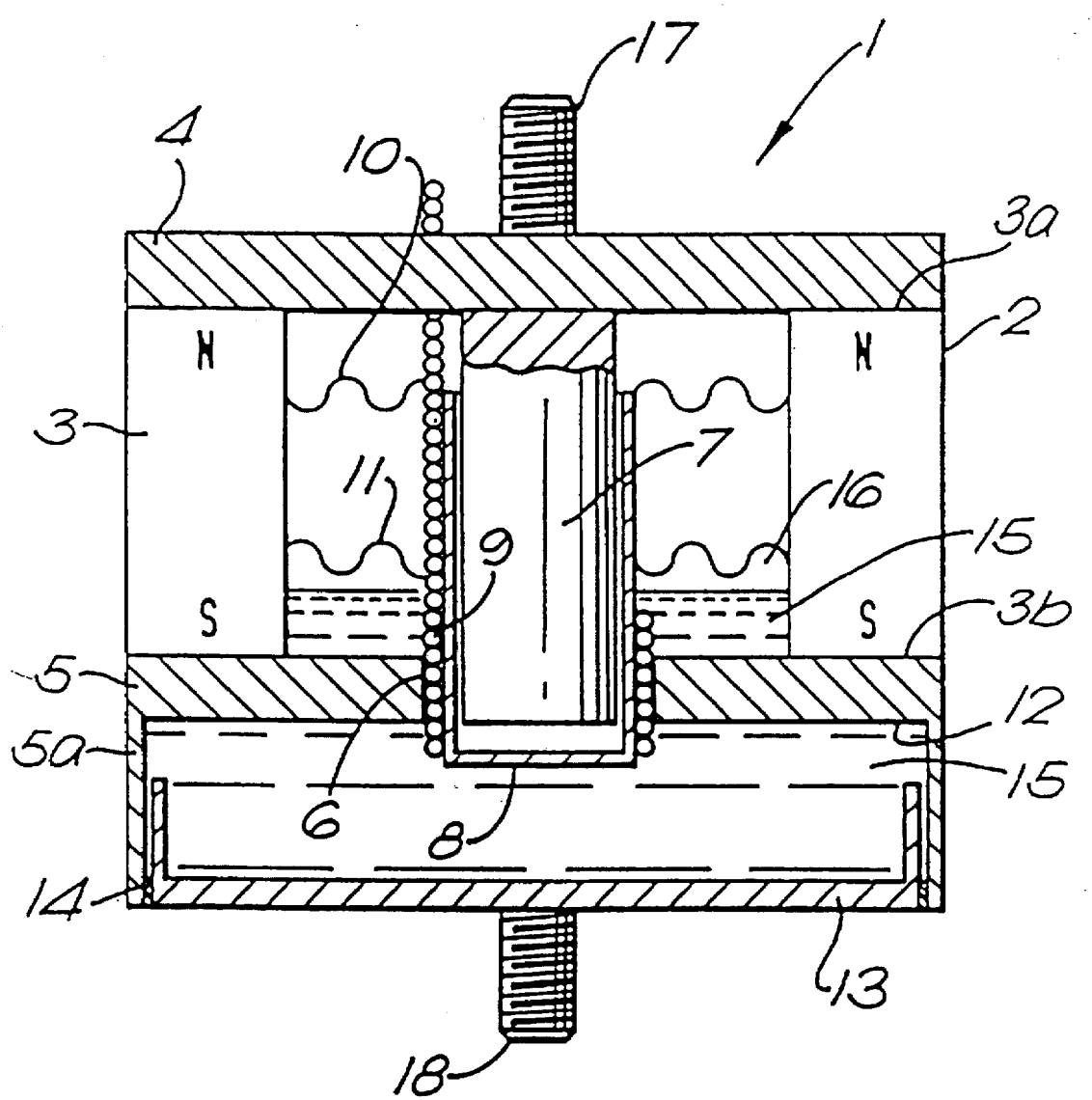
FIG. 1 shows an actuator according to the first aspect of the present invention.

Referring to the FIG. 1, an actuator 1 includes a body 2, formed from an annular permanent magnet 3 having first and second axial extremities 3a, 3b, a disc-shaped first end-piece 4 and a dish-shaped second end-piece 5. The first end-piece has a diameter substantially the same as the outer diameter of the magnet 3 and is affixed coaxially across the first axial extremity 3a thereof. The second end-piece 5 has the same diameter as the first end-piece 4 and is similarly affixed across the second axial extremity 3b of the magnet 3 with its wall portion 5a extending away from the magnet 3.

The second end-piece 5 is provided with an aperture 6 in the centre of its planar portion. A column 7 extends coaxially from the centre of the first end-piece 4 in the direction of the second end-piece 5, passes through the aperture 6 therein.

A first piston 8, comprising a tube having a closed end, supports an energisable coil 9 wound about the tubular portion adjacent the closed end thereof. The first piston 8 is mounted for axial movement relative to the column 7 and is supported by a pair of spiders 10, 11 extending radially inwardly from the inner wall of the magnet 3 such that a portion of the coil 9 is within the aperture 6.

A chamber 12 is defined by the outwardly facing planar surface and the inner surface of the wall portion of the second end-piece 5, and the equivalent surfaces of a dish-shaped second piston 13, coaxially located within the second end-piece 5. An annular sealing member 14 is provided between the outer surface of the wall portion of the second piston 13 and the inner surface of the wall portion of the second end-piece 5. The sealing member 14 ensures a fluid-tight seal between the second piston 13 and the second end-portion 5. The inner surface of the wall portion of the second end-piece 5 and the outer surface of the wall portion of the second piston 13 cooperate to relieve pressure from the sealing member 14 so as to provide a reliable seal.

The actuator 1 is provided with a quantity of hydraulic fluid 15 which occupies the chamber 12 and a portion of an airtight-sealed space 16 within the magnet 3. The space 16 within the magnet 3 communicates with the chamber 12 by means of the restricted gap in aperture 6 between the coil 9 and the second pole piece.

A pair of threaded studs 17, 18 extend axially outwardly from the first end-piece 4 and the second piston 13 respectively for mounting the actuator between a support and a load.

The operation of the actuator wall now be described. When the coil 9 is energised a magnetic field is generated within the body portion 2 which interacts with magnetic field produced by the magnet 3. As a result of this interaction a force is generated on the coil 9 which moves At axially thus moving the first piston 8 into or out of the chamber 12. The movement of the first piston 8 is transferred to the piston 13 by means of the hydraulic fluid in the chamber 12. Since the area of the piston 13 is greater than that of the first piston 8, the piston 13 moves axially a smaller distance than the first piston 8 but exerts a greater force, and thus the arrangement acts as an hydraulic lever.

The first piston 8 is required to have a long travel relative to the travel of the second piston 13 and it might be thought that a fluid tight sliding member would be required for the piston 8 in order to seal the chamber 12. However, in this example of the invention the aperture 6 is provided between the coil 9 and the second end piece 5. At low frequencies fluid from the chamber 12 can flow through the aperture 6 to the chamber 15 and vice versa, but at high frequencies the small aperture 6 prevents rapid fluid flow, thus effectively sealing chamber 12 and allowing force to be transmitted to the piston 13. The construction also prevents the static loading of the actuator displacing the coil 9 away from its central quiescent position (shown in the drawing). The sealed air chamber 16 and the resulting air-gap between the column 7 and the piston 8 means that upon movement of the piston, no hydraulic fluid has to be forced thereby from between the column 7 and piston 8, which would otherwise impede high frequency movement of the piston. Furthermore, the immersion of the coil 9 in the hydraulic fluid 15 leads to improved cooling of the coil.

DETAILED DESCRIPTION OF THE PREFERRED EMBODIMENTS

The actuator shown in FIG. 1 will function in the orientation shown. However, if the actuator 1 is to be used angled or inverted, a high compliance membrane will be required, fixed between the inner wall of the magnet 3 and the first piston 8, such that it retains the hydraulic fluid substantially as shown in FIG. 1 at all orientations of the actuator 1.

The actuator 1 has the advantage that the moving coil device has a linear current force characteristic. The hydraulic lever transforms the low force, long throw output of the moving coil device into a higher force over a shorter throw, which is particularly suited for use in vibration cancellation systems.

Figure 2:
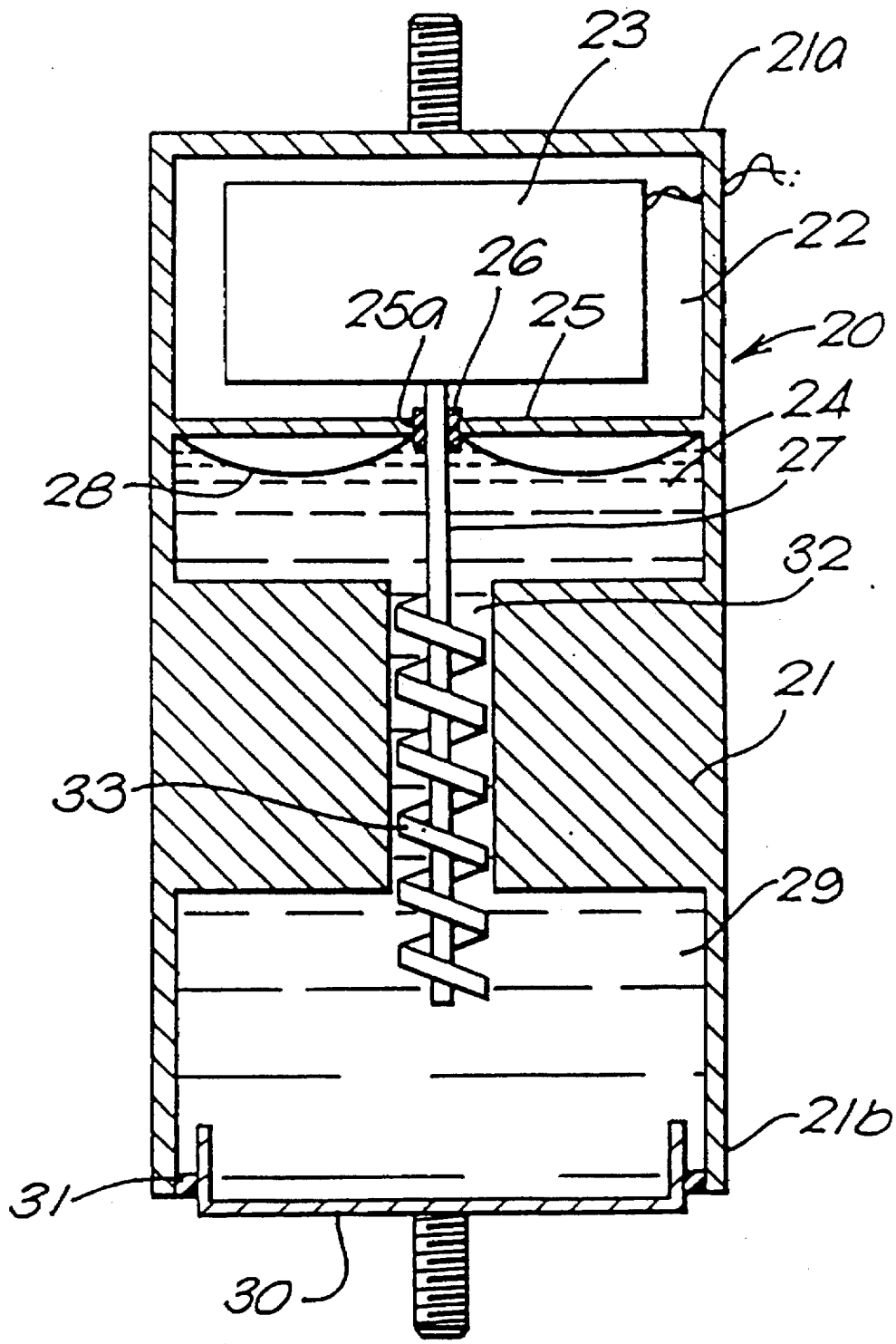
FIG. 2 shows a single screw version of an actuator according to the second aspect of the present invention.

Referring to FIG. 2, an actuator 20 comprises a cylindrical body 21 having first and second axial extremities 21a, 21b. A rotary electric motor 23 is mounted in a motor chamber 22, defined within the body 21 adjacent the first axial extremity thereof. A reservoir chamber 24, for storing hydraulic fluid, is located within the body 21 adjacent the motor chamber 22, from which it is separated by a wall 25. The wall 25 has a centrally located aperture 25a through which the shaft 27 of the motor 23 passes. A fluid tight seal 26 is formed between the shaft 27 and the wall 25. A resiliently flexible annular membrane 28 is located within the reservoir chamber 24, its outer margin being sealingly fixed to the wall 25, where it meets the body 21, and its inner margin being sealingly attached the shaft seal 26.

A working chamber 29 is defined by a cylindrical recess extending into the body 21 from the second axial extremity 21b thereof and a piston 30, arranged to travel a small distance into and out of the cylindrical recess. A sealing member 31 is located between the periphery of the piston 30 and the radial wall of the cylindrical recess.

The working chamber 29 is connected to the reservoir chamber 24 by a passageway 32. The shaft 27 of the motor 23 extends through the length of the passageway 32 wherein it supports an Archimedean screw 33.

In operation, control signals are supplied to the motor 23 causing it to rotate. The rotation of the motor 23 drives the Archimedean screw 33, either causing hydraulic fluid to he transferred from the reservoir chamber 24 to the working chamber 29 or vice versa. As hydraulic fluid is pumped into and out of the working chamber 29 the piston 30 is caused to moved out of and into the cylindrical recess in sympathy with the changing volume of hydraulic fluid within the working chamber 29. The annular membrane 28 flexes into and out of the reservoir chamber 24 as the volume of hydraulic fluid therein changes.

This arrangement allows a relatively low torque motor to produce high forces on the piston with moderate displacements. Furthermore, the return path for the hydraulic fluid through the screw thread, between the working chamber 29 and the reservoir chamber 24, limits the static pressure that can be generated on the piston 30. However, with rapidly changing forces, the mass of hydraulic fluid within the screw thread presents an impediment to the motion of the hydraulic fluid thus effectively closing it to high frequency pressure changes. Likewise, static forces acting on the piston 30 wall not cause rotation of the motor armature. This makes the actuator particularly suitable for use in active engine mounts where it is necessary for the system to ignore the slowly changing forces associated with cornering etc. of a vehicle.

Figure 3:
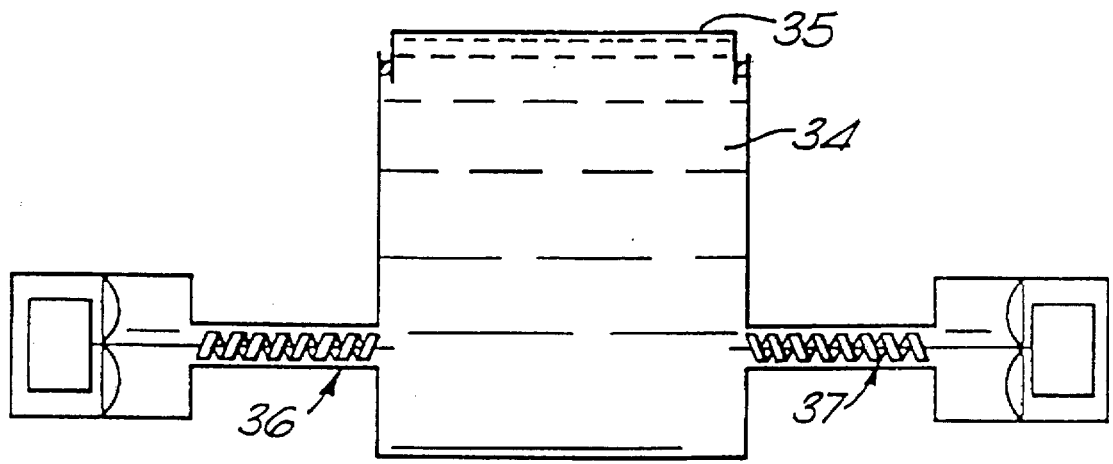
FIG. 3 shows a double screw actuator according to the second aspect of the present invention.

Should rotational reaction forces on the motor stator be undesirable, they may be balanced out by using two counter-rotating Archimedean screws 36, 37, as shown in FIG. 3. In FIG. 3, a working chamber 34 is provided with two opposed Archimedean screw feeds 36, 37 arranged with their axes normal to the direction of travel of the piston 35.

By proper design of the Archimedean screws the frequency response of the actuator may be tailored to suit a particular application.

In an alternative embodiment, the function of the membrane 28 is performed by a compressible air-filled bag located in the reservoir chamber 24.

Figure 4:
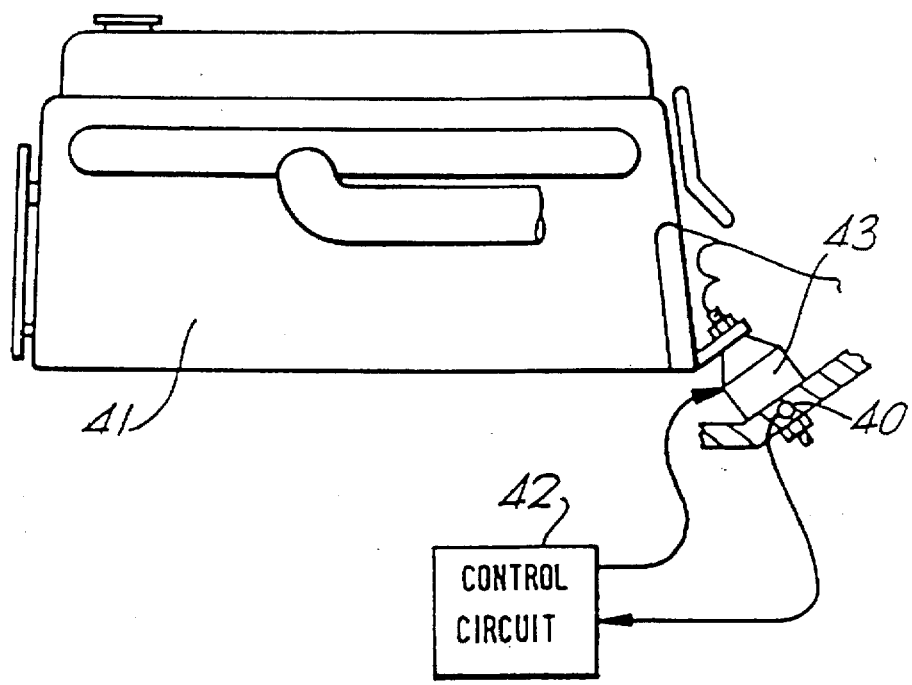
FIG. 4 shows an active vibration control system applied to an internal combustion engine.

Actuators according to the present invention may be employed as part of a vibration cancellation systems, for example, for an i.c. engine in a vehicle. The actuator serving as an engine mount. Referring to FIG. 4, a sensor 40 detects vibrations in a vehicle body caused by an engine 41 and an electronic control circuit 42 produces an actuator energising current in response thereto which drives an actuator 43. High frequency vibrations are thereby cancelled. However, the structure of the actuators of the present invention means that low frequency force changes e.g. those due to cornering, do not propagate through the actuator.

We claim:

1. An electromagnetic actuator comprising:

an annular permanent magnet having a top end, a bottom end, and an inner surface;

a first end-piece affixed coaxially to the top end of the annular permanent magnet:

a dish-shaped second end-piece, having a disk portion with an aperture in its center, and walls extending downwards, said dish-shaped second end-piece being affixed coaxially to the bottom end of the annual permanent magnet;

a hydraulic lever for transforming the output of a transducer, wherein the hydraulic level comprises first piston means, comprising a tube having a closed end mounted coaxially with a column, for transmitting an input displacement, second piston means, having a disk portion and walls extending upwards from the disk portion, mounted coaxially within the second end-piece for transmitting an output displacement, and a chamber therebetween which serves as a reservoir for hydraulic fluid for said hydraulic lever; and a coil wound around the tube adjacent to the closed end of the tube, such that a portion of the coil is within the aperture.

2. An electromagnetic actuator according to claim 1 wherein the coil is a moving coil.

3. An electromagnetic actuator according to claim 1, wherein the diameter of the first end-piece is substantially equal to the outer diameter of the annular permanent magnet.

4. An electromagnetic actuator comprising:

an electrical signal to displacement transducer a hydraulic lever for transforming the output of said transducer, wherein the hydraulic lever comprises a first piston means to which said transducer is connected, a second piston means, and a chamber therebetween and wherein the first piston means comprises a tube having a closed end on which said transducer is mounted, wherein when said transducer is energized said transducer moves along its axis thereby causing the first piston means to move into or out of the chamber, wherein the movement of the first piston means is transferred to the second piston means by a hydraulic fluid which occupies the chamber thereby causing the second piston means to move along its axis.

5. An electromagnetic actuator comprising:

an electrical signal-to-displacement transducer, wherein said transducer comprises an annular permanent magnet, a first end-piece and a dish-shaped second end-piece wherein the diameter of the first end-piece is substantially equal to the outer diameter of the annular permanent magnet, and wherein the first end-piece is affixed coaxially across a first end of the annular permanent magnet, wherein the second end-piece has substantially the same diameter as the first end-piece, and wherein the second end-piece is affixed coaxially across a second end of the annular permanent magnet, a chamber substantially defined by and within said transducer, and a hydraulic lever for transforming the output of said transducer, wherein said chamber serves as a reservoir for hydraulic fluid for said hydraulic lever.

6. An electromagnetic actuator according to claim 5, wherein a first portion of the chamber is formed by the second end-piece and by a dish-shaped second piston coaxially located within the second end-piece.

7. An electromagnetic actuator according to claim 6, wherein a second portion of the chamber is formed by the inner walls of the annular permanent magnet, and wherein the second portion of the chamber is in fluid communication with the first portion of the chamber via a restricted gap.

8. An electromagnetic actuator comprising:

an electrical signal-to-displacement transducer, wherein said transducer comprises an annular permanent magnet, a first end-piece and a dish-shaped second end-piece, a chamber substantially defined by and within said transducer, wherein the chamber comprises a first portion formed by the bottom surface of the second end-piece and a dish-shaped piston, and a second portion formed by the inner walls of the annular permanent magnet, the top surface of the second end-piece and the bottom surface of the first end-piece, and a hydraulic lever for transforming the output of said transducer, wherein said chamber serves as a reservoir for hydraulic fluid for said hydraulic lever.

9. An electromagnetic actuator according to claim 8, wherein the first portion of the chamber is in fluid communication with the second portion of the chamber via a restricted gap.

10. An electromagnetic actuator according to claim 9, wherein the restricted gap is selected such that it allows fluid flow between the first portion and the second portion of the chamber at low frequencies, but it does not allow rapid fluid flow between the first portion and the second portion of the chamber at high frequencies.

11. An electromagnetic actuator comprising:

(a) an annular permanent magnet having a top end, a bottom end, and an inner surface;

(b) a disk-shaped first end-piece affixed coaxially to the top end of the annular permanent magnet;

(c) a dish-shaped second end-piece, having a disk portion with an aperture in its center, and walls extending downwards, said second end-piece being affixed coaxially to the bottom end of the annual permanent magnet;

(d) a first piston comprising a tube having a closed end mounted coaxially with a column;

(e) a coil wound around the tube adjacent to the closed end of the tube, such that a portion of the coil is within the aperture; and (f) a dish-shaped second piston having a disk portion and walls extending upwards from the disk portion, mounted coaxially within the second end-piece, wherein a chamber is formed having two portions, the first portion being formed by the bottom surface of the first end-piece, the inner surfaces of the annular permanent magnet, and the top surface of the second end-piece, and the second portion being formed by the bottom surface of the second end-piece, the walls of the second end-piece, and the top surface and walls of the second piston, the first portion of the chamber being in fluid communication with the second portion of the chamber via a restricted gap formed by the aperture in the second end-piece, the coil and the first piston.

12. The electromagnetic actuator of claim 11, wherein the restricted gap is selected such that it allows fluid flow between the first and second portions of the chamber at low frequencies, but it does not allow rapid fluid flow between the first and second portions of the chamber at high frequencies.

* * * * *